United States Patent [19]

Püntener et al.

[11] 4,452,602

[45] Jun. 5, 1984

[54] PROCESS FOR DYEING LEATHER WITH MIXTURES OF DYES

[76] Inventors: Alois Püntener, Pulverweg 13, 4310 Rheinfelden; Josef Koller, Römerstrasse 22, 4153 Reinach; Fabio Beffa, Burgstrasse 38, 4125 Riehen, all of Switzerland

[21] Appl. No.: 360,025

[22] Filed: Mar. 19, 1982

[30] Foreign Application Priority Data

Mar. 23, 1981 [CH] Switzerland ............... 1953/81
Dec. 21, 1981 [CH] Switzerland ............... 8158/81

[51] Int. Cl.³ .................... D06P 1/10; D06P 3/30; D06P 3/32
[52] U.S. Cl. ......................... 8/404; 8/436; 8/437; 8/639
[58] Field of Search ............. 8/404, 436, 437

[56] References Cited

U.S. PATENT DOCUMENTS 4,085,097 4/1978 Beffa et al. ............... 260/149
4,150,942 4/1979 Hollinger et al. ............... 8/437

FOREIGN PATENT DOCUMENTS 260455 5/1963 Australia ............... 8/437

Primary Examiner—Maria Parrish Tungol

[57] ABSTRACT

A mixture of at least three selected 1:2 chromium or 1:2 cobalt complex dyes of different colors and belonging to the azo or azomethine series is used for dyeing leather and furs. The mixtures of dyes make it possible for the first time to dye leather by the trichromatic process.

23 Claims, No Drawings

PROCESS FOR DYEING LEATHER WITH MIXTURES OF DYES

The present invention relates to a process for dyeing leather with mixtures of 1:2 chromium or cobalt complex dyes and to the leather which has been dyed by this process.

The use of 1:2 chromium or cobalt complex dyes for dyeing leather has already been known for a long time. From time to time, mixtures of these dyes are also employed. In so doing, however, difficulties frequently arise owing to the great differences in the affinity for leather of the various dyes, so that in most cases it is only possible to use mixtures of dyes which have similar shades.

Mixtures of three dyes and, in particular, a trichromatic system of dyes, i.e. a mixture of a yellow, a red and a blue dye, by means of which it is possible to achieve virtually all shades, according to the proportions of the three components, have hitherto not been used for leather, nor has this been considered possible by those skilled in the art. Thus it is stated by K. Eitel in Bayer Farben Revue, Sonderheft 19, page 31 (1981): "For dyeing leather the trichromatic process is at present not practicable because the manufactured products vary greatly and have various dyeing properties, and, especially, because of the great difference in the affinity for dyes between the grain side and the flesh side."

The present invention was based on the object of developing a process for dyeing leather with mixtures of three or more dyes of different colours, which permits different types of leather to be dyed and, in addition, enables the trichomatic process to be used.

This object is achieved, in accordance with the invention, by selecting mixtures of dyes composed of dyes which have a similar depth of penetration and have only a slight tendency to aggregate in aqueous solutions containing electrolytes. Such mixtures make it possible to carry out even the trichromatic process and, surprisingly, level dyeings are obtained regardless of the type of leather, the grain side and the flesh side of the leather being dyed in virtually the same shade, in many cases even in identical shades. The resulting dyeings have good fastness properties, in particular good fastness to light and fastness to diffusion when in contact with plasticised PVC.

The present invention relates to a process for dyeing leather and furs with mixtures of dyes, which comprises using, for dyeing, an aqueous liquor containing at least three 1:2 chromium or 1:2 cobalt complex dyes which have different colours, belong to the azo, azo-azomethine or azomethine series and have 1-6 sulfonic, carboxylic or phosphonic acid groups, and which (a) have a depth of penetration on standard chrome leather of between 20 and 200 μm, the differences in depth of penetration between the individual dyes in the mixture being within a range of 100 μm, and (b) have no tendency, or only a slight tendency, to aggregate in aqueous solutions containing electrolytes.

The figures quoted for the depth of penetration relate to standard chrome calf leather, prepared, for example, in accordance with the specification VESLIC, C 1510, IUF 151 dated 11.12.1969 of the Association of Swiss Leather Chemists, and apply to a 1:1 standard depth dyeing which has been carried out in accordance with the conditions for dyeing in Example 3 of the present application, the depth of penetration being measured under the microscope on a cross-section through the leather.

Dyes which have no tendency, or only a slight tendency, to aggregate in aqueous solutions containing electrolytes are to be understood as dyes which exhibit an absorption of light of an aqueous solution containing 50 mg/l of dye and 10 g/l of NaCl which is not more than 5%, preferably not more than 2%, lower than the absorption of a solution of the same quantity of the dye in distilled water, the decrease in the absorption being determined at the absorption maximum.

In the process according to the invention it is preferable to use mixtures of dyes which have a similar absorption behaviour, i.e. dyes which exhibit only a slight change, or none at all, during the entire dyeing process, in the shade of the proportion of the dye mixture which is absorbed onto the leather during the individual periods of time of the dyeing process.

It is preferable to use dyes which have a depth of penetration of 30–150 μm, and particularly good results in respect of evenness of dyeings are achieved if the dyes used for the mixture of dyes exhibit differences within a range of 50 μm in the depth of penetration of the individual dyes in the mixture.

As a result of their hydrophilic character, the dyes used in accordance with the invention are very readily soluble in water.

A preferred embodiment of the process according to the invention consists in using a mixture of a yellow, a red and a blue dye, i.e. a trichromatic system.

Yellow dyes are to be understood as meaning all dyes which have a yellow shade, for example yellowish brown or reddish-tinged or greenish-tinged yellow dyes. Orange to reddish brown dyes are, as a group, described as red dyes, and blue, grey or violet dyes are described as blue dyes.

It is preferable to use, in the process according to the invention, an aqueous dye liquor containing a mixture of dyes of the formula I

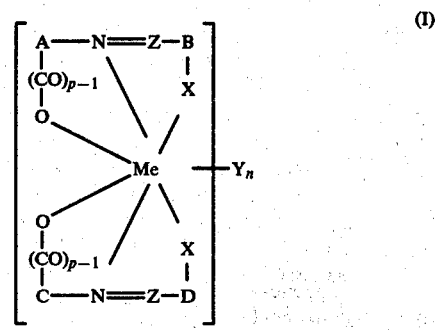

in which the Z's independently of one another are nitrogen or a CH group, A and C independently of one another are in each case a radical of the benzene or naphthalene series containing a hydroxyl or carboxyl group in the o-position in relation to the azo or azomethine group, B and D independently of one another are in each case the radical of a coupling component, provided that Z is nitrogen, the coupling component containing the group X in the o-position or α-position in relation to the azo group, or, if Z is a CH group, B and D independently of one another are the radical of an o-hydroxyaldehyde, the X's independently of one another are in each case oxygen or a group of the formula —NR— in which R is hydrogen or a $C_1$-$C_4$-alkyl group, Me is chromium or cobalt, Y is the SO$_3$H, COOH or PO$_3$H$_2$ group, p is 1 or 2 and n is an integer from 1 to 6.

The dyes have an anionic character and are advantageously employed in the form of their salts, in particular alkali metal salts, for example lithium, potassium or sodium salts, or as their ammonium salts. Ammonium salts are also to be understood as meaning salts of organic amines, for example amines which are substituted by C$_1$–C$_6$-alkyl or hydroxy-C$_1$–C$_6$-alkyl groups.

Both symmetrical and asymmetrical 1:2 azo complexes or 1:2 azomethine complexes, and also 1:2 complexes containing an azo or an azomethine dye attached to the metal, are suitable as dyes of the formula I.

It is preferable to use dyes of the formula I in which X is oxygen.

If the dyes of the formula I have several groups Y, the latter can be identical or different, i.e. the dyes can contain sulfonic acid groups and/or carboxylic acids groups and/or phosphonic acid groups. Preferably, however, all the Y's are SO$_3$H groups.

Furthermore, it is preferable to use dyes of the formula I in which p is 1, and also dyes in which n is 1 to 3, preferably 2.

The individual dyes in the dye mixtures used preferably contain 24 to 40 C atoms in each case, in particular 28 to 36 C atoms and especially 32 C atoms.

The molecular weight of the 1:2 metal complex dyes used in accordance with the invention is preferably between 800 and 1,000 (calculated as the free acid).

The radicals A and C can carry one or more carboxylic, phosphonic or sulfonic acid groups and can, in addition, have further substituents, in particular C$_1$–C$_4$-alkyl, C$_1$–C$_4$-alkoxy, chlorine or nitro.

The following are examples of suitable diazo components A and C: anthranilic acid, 4-sulfoanthranilic acid, 5-sulfoanthranilic acid, 2-amino-1-hydroxybenzene, 4-chloro-2-amino-1-hydroxybenzene, 4,6-dichloro-2-amino-1-hydroxybenzene, 4-nitro-2-amino-1-hydroxybenzene, 5-nitro-2-amino-1-hydroxybenzene, 4-chloro-6-nitro-2-amino-1-hydroxybenzene, 4-methyl-6-nitro-2-amino-1-hydroxybenzene, 6-chloro-4-nitro-2-amino-1-hydroxybenzene, 4-cyano-2-amino-1-hydroxybenzene, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 4,6-dinitro-2-amino-1-hydroxybenzene, 2-amino-1-hydroxybenzene-4-sulfonic acid, 2-amino-1-hydroxybenzene-5-sulfonic acid, 4-nitro-2-amino-1-hydroxybenzene-6-sulfonic acid, 5-nitro-2-amino-1-hydroxybenzene-4-sulfonic acid, 6-nitro-2-amino-1-hydroxybenzene-4-sulfonic acid, 6-chloro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 2-amino-1-hydroxybenzene-4,6-disulfonic acid, 1-amino-2-hydroxybenzene-4-sulfonamide or 4-methylsulfonyl-2-amino-1-hydroxybenzene.

Preferably A and C independently of one another are each the radical of a 1-hydroxy-2-aminobenzene which is unsubstituted or monosubstituted or polysubstituted by identical or different substituents belonging to the series comprising nitro, sulfo, chlorine, methyl or methoxy, and are, in particular, the radical of a 1-hydroxy-2-aminobenzene which carries a nitro group in the 4-position or 5-position, or are the radical of a 1-hydroxy-2-aminobenzene which carries a nitro group in the 4-position and a sulfo group in the 6-position, or are the radical of a 1-hydroxy-2-aminobenzene which carries a sulfo group in the 4-position and a nitro group in the 6-position.

The radicals B and/or D are preferably derived from the following groups of coupling components: phenols which couple in the o-position and which are unsubstituted or substituted by lower alkyl or alkoxy, amino or acylamino, acylamino being C$_1$–C$_4$-alkanoylamino, C$_1$–C$_4$-alkylsulfonylamino, C$_1$–C$_4$-alkoxycarbonylamino, aroylamino or arylsulfonylamino radicals, resorcinol or m-phenylenediamine which are unsubstituted or substituted in the 4-position by sulfo, chlorine, methyl or methoxy, naphthols which are unsubstituted or substituted by C$_1$–C$_4$-alkyl, C$_1$–C$_4$-alkoxy, chlorine, amino, acylamino or sulfo, acylamino being as defined above, or 5-pyrazolones or 5-aminopyrazoles which have, in the 1-position, a phenyl or naphthyl radical which is unsubstituted or substituted by chlorine or nitro, C$_1$–C$_4$-alkyl, C$_1$–C$_4$-alkoxy or sulfo groups, and which have, in the 3-position, a C$_1$–C$_4$-alkyl group, in particular a methyl group.

Acetoacetamides or acetoacetanilides and benzoylacetanilides which can, if desired, be substituted in the anilide nucleus by chlorine or by C$_1$–C$_4$-alkyl, C$_1$–C$_4$-alkoxy or sulfo groups, or 6-hydroxy-3-cyano-4-alkyl-2-pyridones or 6-hydroxy-3-carbonamido-4-alkyl-2-pyridones which are substituted in the 1-position by substituted or unsubstituted C$_1$–C$_4$-alkyl, for example methyl, isopropyl, β-hydroxyethyl, β-aminoethyl or γ-isopropoxypropyl, or by phenyl, and which can carry a C$_1$–C$_4$-alkyl group, in particular methyl, in the 4-position.

The following are examples of such coupling components: 2-naphthol, 1,3-dihydroxynaphthalene, 1,5-dihydroxynaphthalene, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 1-naphthol-3,6-disulfonic acid, 1-naphthol-4,8-disulfonic acid, 1-naphthol-3,8-disulfonic acid, 2-naphthol-3,6-disulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1-sulfonic acid, 1-naphthylamine-4-sulfonic acid, 1-naphthylamine-5-sulfonic acid, 2-aminonaphthalene-6-sulfonic acid, 2-aminonaphthalene-5-sulfonic acid, 1-phenyl-3-methylpyrazol-5-one, 1-phenyl-5-pyrazolone-3-carboxylic acid amide, 1-(2'-, 3'- or 4'-methylphenyl)-3-methylpyrazol-5-one, 1-(2'-, 3'- or 4'-sulfophenyl)-3-methylpyrazol-5-one, 1-(2'-chloro-5'-sulfophenyl)-3-methylpyrazol-5-one, 1-(2'-methoxyphenyl)-3-methylpyrazol-5-one, 1-(4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'-dichlorophenyl)-3-methylpyrazol-5-one, 1-(3',4'-dichlorophenyl)-3-methylpyrazol-5-one, 1-(2',5'-dichloro-4'-sulfophenyl)-3-methylpyrazol-5-one, 1-(2'-, 3'- or 4'-sulfophenyl)-3-methyl-5-aminopyrazole, 1-(2'-chloro-5'-sulfophenyl)-3-methyl-5-aminopyrazole, acetoacetanilide, acetoacetanilide-2-, -3- or -4-sulfonic acid, acetoacet-o-anisidide, acetoacet-o-toluidide, acetoacet-o-chloroanilide, acetoacet-m-xylidide, tetralol, 4-methylphenol, a 3-dialkylaminophenol, especially 3-dimethylaminophenol and 3-diethylaminophenol, 4- butylphenol, 4-amylphenol, especially 4-t.-amylphenol, 2-isopropyl-4-methylphenol, 2-acetylamino-4-methylphenol, 3-acetylamino-4-methylphenol, 2-methoxycarbonylamino-4-methylphenol, 2-ethoxycarbonylamino-4-methylphenol, 3,4-dimethylphenol, resorcinol, 1-ethyl-3-cyano-4-methyl-6-hydroxypyridone, 1-methyl-3-cyano-4-methyl-6-hydroxypyridone and 1-phenyl-3-carbonamido-4-methyl-6-hydroxypyridone.

Preferably, B or D is a 1-naphthol or 2-naphthol which is unsubstituted or substituted by a sulfo group, m-phenylenediamine, resorcinol, p-($C_1$–$C_4$)-alkylphenol, 1-phenyl-3-methyl-5-pyrazolone or acetoacetanilide, it being possible for the phenyl group in the two compounds last mentioned to be substituted by $C_1$–$C_4$-alkyl, $C_1$–$C_4$-alkoxy, chlorine or sulfo.

If Z is the —CH— group, B or D is the radical of an o-hydroxyaldehyde, preferably the radical of an o-hydroxybenzaldehyde or o-hydroxynaphthaldehyde. The following are examples of suitable aldehydes: 2-hydroxy-1-naphthaldehyde, 1-hydroxy-2-naphthaldehyde, 2-hydroxybenzaldehyde, 3-methyl-2-hydroxybenzaldehyde, 5-methyl-2-hydroxybenzaldehyde, 3,5-dimethyl-2-hydroxybenzaldehyde, 5-butyl-2-hydroxybenzaldehyde, 5-chloro-2-hydroxybenzaldehyde, 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2'-, 3'- or 4'-sulfophenylazo)-2-hydroxybenzaldehyde or 5-(6'-sulfonaphthyl-1'-azo)-2-hydroxybenzaldehyde.

Preferably, the dyes employed in the mixtures are in each case symmetrical 1:2 metal complexes containing 2 sulfo groups.

Because they are readily accessible and can be combined well with one another, mixtures of dyes which are particularly suitable for the dyeing process according to the invention are those of the formula II

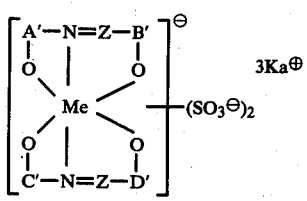

in which the Z's independently of one another are nitrogen or a CH group, A' and C' are in each case the radical of a 1-hydroxy-2-aminobenzene which carries a nitro group in the 4-position or 5-position, or are the radical of a 1-hydroxy-2-aminobenzene which carries a nitro group in the 4-position and a sulfo group in the 6-position, or are the radical of a 1-hydroxy-2-aminobenzene which carries a nitro group in the 6-position and a sulfo group in the 4-position, B' and D' independently of one another are in each case the radical of one of the following coupling components, provided that Z is nitrogen; 1-naphthol or 2-naphthol which is unsubstituted or substituted by a sulfo group, m-phenylenediamine, resorcinol, p-($C_1$–$C_6$)-alkylphenol, 1-phenyl-3-methyl-5-pyrazolone or acetoacetanilide, it being possible for the phenyl group in the two compounds last mentioned to be substituted by $C_1$–$C_4$-alkyl, $C_1$–$C_4$-alkoxy, chlorine or sulfo, or, if Z is the CH group, B' and D' are the radical of an o-hydroxybenzaldehyde or o-hydroxynaphthaldehyde which can be substituted by phenylazo or sulfophenylazo, Me is cobalt or chromium and $Ka^{\oplus}$ is a cation.

Mixtures of dyes of the formula II in which Z is nitrogen are particularly suitable.

Amongst these, it is preferable to use mixtures containing (a) a dye of the formula III

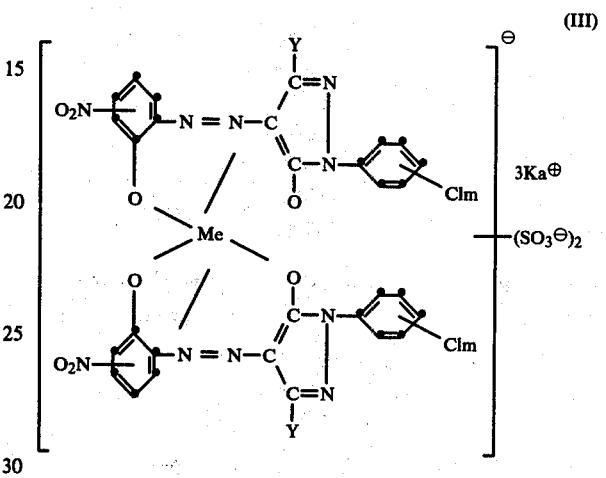

in which m is an integer from 0 to 2, Me is cobalt or chromium, $Ka^{\oplus}$ is a cation and Y is methyl, —$CONH_2$ or —CO—NHR, R being an alkyl group having 1–4 C atoms, (b) a dye of the formula IV

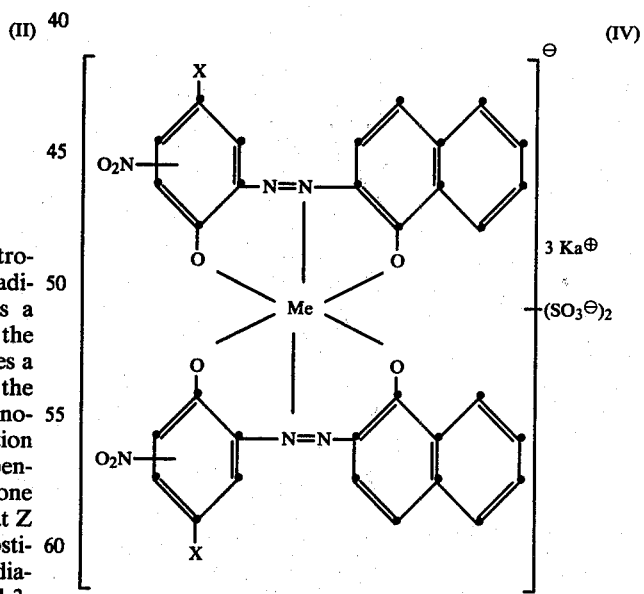

in which X is hydrogen, chlorine, methyl or methoxy, Me is cobalt or chromium and $Ka^{\oplus}$ is a cation, and (c) a further dye of the formula III indicated above or a dye of the formula V

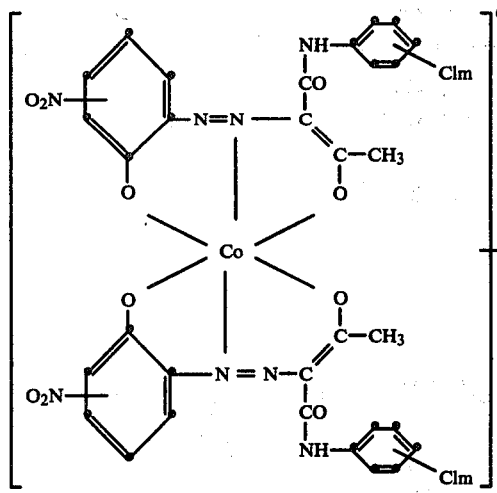

(V)

in which m is an integer from 0 to 2 and $Ka^{\oplus}$ is a cation.

Mixtures which are very particularly preferred contain at least one of the following dyes:

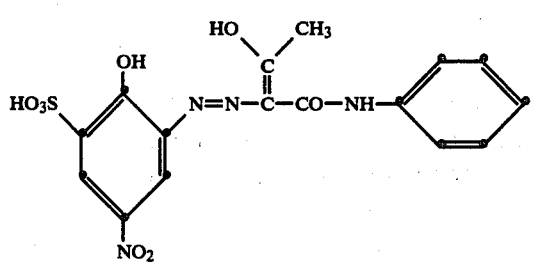

(VI)

1:2 cobalt complex

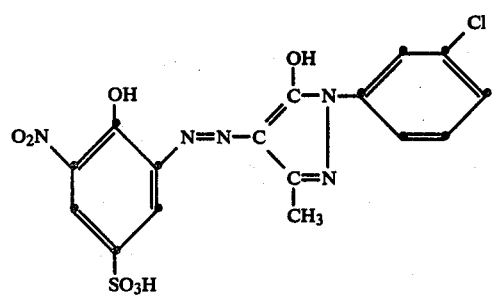

(VII)

1:2 chromium complex

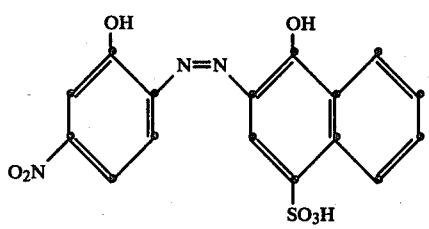

(VIII)

1:2 chromium complex

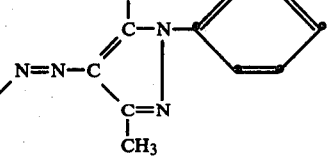

(IX)

1:2 cobalt complex

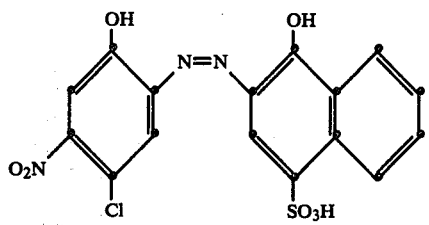

(X)

1:2 chromium complex

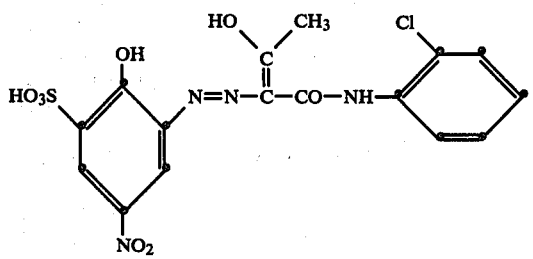

(XI)

1:2 cobalt complex

The quantities in which the dyes to be used in accordance with the invention are employed in the dyebaths can vary within wide limits, depending on the depth of shade desired. In general, quantities of dye of 0.1 to 10, preferably 0.5 to 4, % by weight, based on the weight of the leather to be dyed, are advantageous.

In addition to water and the dyes, the dye liquor can also contain further additives, for example acids, bases or salts for the purpose of adjusting the pH to the desired value, and also assistants, for example wetting agents, fat-liquoring agents, assistants for deepening the shade, levelling agents and/or anti-foams.

The process according to the invention has the great advantage that it is not only suitable for one specific type of leather, but is also applicable to a very wide variety of types of leather, for example chrome leather, re-tanned leather or goatskin, cow-hide or pigskin suede leather, and also furs.

By virtue of the good tinctorial balance of the dyes used in accordance with the invention, it is now also possible to make use, for leather, of the interesting opportunities afforded by colorimetric formulation. This method, which is very widely used in the textile field, enables dyeing to be carried out efficiently in any desired shade. Patterns on textile materials or leather can thus be analysed by means of stored data and can be imitated without time-consuming formulations in the laboratory.

Dyeing is preferably carried out by the exhaust method, for example at a liquor ratio of 1:1.5 to 1:20, preferably 1:2 to 1:10, and at temperatures of 20° to 100°

C., preferably 40° to 60° C. If it is desired or necessary, the leather can be subjected to a pretreatment, for example neutralisation of fulling.

The dyeing time varies, depending on the type of leather and the depth of shade desired, but is in general between 45 and 180 minutes. After dyeing, the leather is rinsed and finished in a customary manner.

The examples which follow illustrate the invention, without limiting it thereto. Temperatures are quoted in degrees centigrade and percentages are by weight, based on the weight of the leather. The quantities of dye quoted are based on undiluted products, such as are obtained by customary laboratory and industrial processes which are described in the literature.

EXAMPLE 1

100 parts of chrome tanned suede garment leather having a shaved thickness of 0.9 mm are wetted back for 60 minutes at 50° with 1,000 parts of water and 2 parts of 24% ammonia contained in a conventional drum-shaped glass vessel. This is followed by a washing process lasting 15 minutes in 1,000 parts of water at 50°.

After these preparatory operations, the leather is dyed at 50° in a liquor containing 1,000 parts of water, 2 parts of 24% ammonia, 0.48 part of the yellow dye of the formula VI

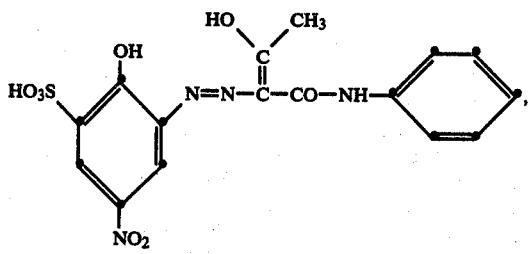

1:2 cobalt complex 1.20 parts of the red dye of the formula VII

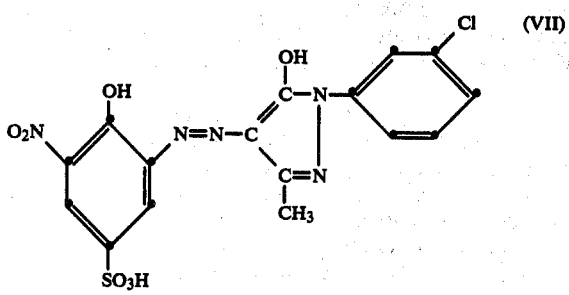

1:2 chromium complex and 0.92 part of the blue dye of the formula VIII

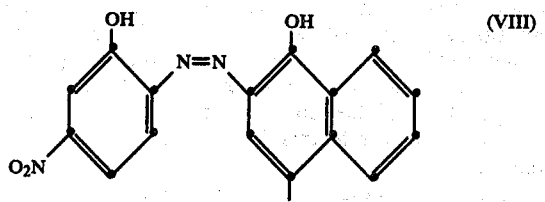

1:2 chromium complex

After a dyeing time of 60 minutes, the liquor is acidified with 2 parts of 85% formic acid, diluted with 20 parts of water, and dyeing is then continued for a further 20 minutes.

The dyed leather is finished in a customary manner after it has been thoroughly rinsed in fresh water and, if desired, treated for 30 minutes at 50° with 2 parts of a dicyandiamide/formaldehyde condensation product.

The resulting dyed leather has a medium brown hue. It is distinguished by good evenness and good fastness properties, in particular good fastness to light.

EXAMPLE 2

The procedure described in Example 1 is repeated in exactly the same manner, except that 0.80 part of the yellowish brown dye of the formula IX

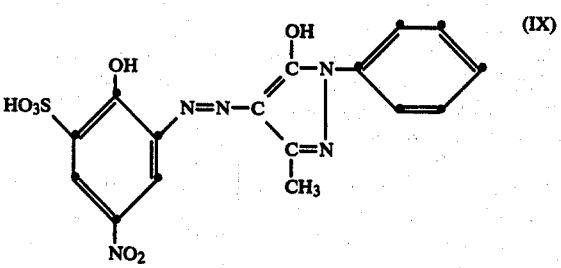

1:2 cobalt complex is used instead of the 0.48 part of the yellow dye of the formula VI employed in Example 1. A leather which has been dyed reddish brown is obtained. The dyeing is level and has good fastness properties.

EXAMPLE 3

100 parts of chrome tanned side leather having a shaved thickness of 1.4 mm are wetted back for 45 minutes at 30° in a liquor consisting of 200 parts of water, 1 part of sodium bicarbonate and 1 part of sodium formate, and are then washed twice at the same temperature with 300 parts of water.

The leather which has been neutralised in this manner is then dyed at 50° with 0.65 part of a mixture of dyes consisting of 0.12 part of the dye of the formula VI (depth of penetration approx. 50 μm), 0.3 part of the dye of the formula VII (depth of penetration approx. 70 μm) and 0.23 part of the dye of the formula VIII (depth of penetration approx. 100 μm), in 300 parts of water. After 30 minutes, 3 parts of a synthetic fat-liquoring agent (a mixture of alkylbenzenes, aliphatic hydrocarbons, alkanesulfonic acids and surfactants) are added to the dye liquor, followed after a further 30 minutes by 0.5 part of 85% formic acid, diluted with 5 parts of water. Treatment is then continued for a further 20 minutes at 50°.

Thorough rinsing in cold water and finishing in a customary manner gives a leather which has been evenly dyed medium brown and has excellent fastness properties, in particular good fastness to diffusion when in contact with plasticised PVC. The hue is identical with that of the dyeing obtained in Example 1.

EXAMPLE 4

The procedure described in Example 3 is repeated, except that 1.04 parts of a mixture of dyes consisting of 0.54 part of the dye of the formula IX (depth of penetration approx. 80 μm), 0.34 part of the dye of the formula VII and 0.16 part of the dye of the formula VIII, are used instead of the mixture of dyes employed in Example 3. A leather which has been dyed yellowish-tinged medium brown is obtained.

EXAMPLE 5

100 parts of chrome side leather are neutralised in accordance with the instructions in Example 3 and are then dyed at 50° in a liquor consisting of 300 parts of water, 5 parts of a synthetic re-tanning substance (condensation products of sulfonic acids, sulfones and polysulfones with formaldehyde and urea), and 2.08 parts of the mixture of dyes employed in Example 4. After a dyeing time of 30 minutes, 3 parts of the synthetic fat-liquoring agent from Example 3 are added, followed after a further 30 minutes by 1 part of 85% formic acid, diluted with 10 parts of water. After acidification, the treatment is continued for a further 20 minutes at 50°. The leather is then rinsed in cold water and finished in a customary manner.

The resulting yellowish-tinged medium brown dyeing is distinguished by good fastness properties, in particular by remarkable fastness to light. In addition, its hue is substantially identical with that of the dyeing obtained in Example 4, using the same trichromatic system, on chrome side leather which has not been re-tanned.

EXAMPLE 6

The procedure described in Example 5 is repeated, except that 1.3 parts of the mixture of dyes employed in Example 3 are used instead of the mixture of dyes employed in Example 5. A dyeing is obtained which, similarly, is identical in hue with the dyeing obtained in Example 3 on chrome side leather which has not been retanned.

EXAMPLE 7

100 parts of neutralised chrome calf leather are dyed for 30 minutes at 50° in a liquor containing 200 parts of water, 0.18 part of the dye of the formula VI, 0.10 part of the dye of the formula VII and 0.11 part of the dye of the formula VIII. The liquor is then acidified with 0.25 part of 85% formic acid, diluted with 2.5 parts of water, and treatment is continued for 20 minutes. 1 part of a shade-deepening assistant (an ethoxylated alkylamine) is then added. After a further treatment time of 20 minutes, the same quantity of the abovementioned dyes is again added to the dyebath and dyeing is then continued for 15 minutes at 50°. A further 0.25 part of 85% formic acid is then added. Dyeing is complete after a further 20 minutes. The leather is then rinsed in cold water and is subsequently fat-liquored for 60 minutes at 50° in a fresh liquor containing 3 parts of the synthetic fat-liquoring agent from Example 3 in 400 parts of water.

After being finished in a customary manner, the dyeing is distinguished by excellent fastness properties and by a full, dark brown hue. It is substantially darker than a corresponding dyeing without the shade-deepening assistant. The same results are also obtained using the other mixtures of dyes.

EXAMPLE 8

100 parts of pigskin suede leather are wetted back for 60 minutes at 50° in a liquor consisting of 1,000 parts of water, 1 part of a non-ionic wetting agent (a mixture of ethoxylated fatty alcohols and alkylphenols) and 2 parts of 24% ammonia. The leather is then washed for 15 minutes in 1,000 parts of water at 50°.

The leather which has been pretreated in this manner is then worked for 5 minutes at 50° in a fresh liquor consisting of 1,000 parts of water and 1 part of 24% ammonia. 5 parts of the synthetic re-tanning substance from Example 5 are then added to this liquor, followed 10 minutes later by 2.70 parts of a mixture of dyes consisting of 0.84 part of the dye of the formula IX, 0.18 part of the dye of the formula VII and 1.68 parts of the dye of the formula VIII, as well as 1 part of a dyeing assistant (ethoxylated amines). After a dyeing time of 60 minutes at 50°, the leather is fat-liquored for 40 minutes at the same temperature and in the same liquor by adding 6 parts of a fat-liquoring agent consisting of sulfited fish oil. Finally, the liquor is also acidified with 4 parts of 85% formic acid, diluted with 40 parts of water, and the leather is worked for a further 30 minutes at 50°. The dyed leather is then rinsed in cold water and finished in a customary manner. This gives a grey dyeing which has good evenness and equality of shade between the grain and flesh sides.

EXAMPLE 9

100 parts of a chrome tanned bulls' hide which has a shaved thickness of 1.1 mm and has not been intermediately dried, are pretreated for 15 minutes at 30° in 300 parts of water in the presence of 0.3 part of a sequestering agent (ethylenediamine tetraacetate).

This is followed by a re-tanning treatment, lasting for 90 minutes and using 5 parts of a chromium-containing synthetic tanning substance in 100 parts of water at 50°. The leather is then washed for 10 minutes in 500 parts of water at 30°.

The re-tanned leather is then neutralised at 30° in a solution of 300 parts of water and 1.5 parts of sodium formate for 10 minutes and, after adding 2.5 parts of sodium bicarbonate, is neutralised for a further 80 minutes. It is then washed for 5 minutes in 500 parts of water at 40°.

The upholstery leather which has been re-tanned and neutralised in this manner is then worked for 20 minutes at 30° in a liquor prepared from 100 parts of water, 2 parts of 24% ammonia and 3 parts of a levelling agent (a mixture of a sulfonated mixture of sulfones obtained from phenol and crude cresol, together with size). 1.32 parts of a mixture of dyes consisting of 0.86 part of the dye of the formula VI, 0.20 part of the dye of the formula VII and 0.26 part of the dye of the formula VIII, are then added. After a dyeing time of 30 minutes, a mixture of fat-liquoring agents consisting of 4 parts of the fat-liquoring agent from Example 3 and 2 parts of sulfated fish oil, is also added and dyeing is continued until penetration is achieved, which is the case after 60 minutes. The liquor is then diluted with 200 parts of water at 70° and, after 15 minutes, is acidified (pH 4.0) with 1.5 parts of 85% formic acid, mixed with 15 parts of water, and the leather is worked for a further 30 minutes.

The leather is then topped for 20 minutes at 50° in a fresh liquor containing a further 0.66 part of the mixture of dyes employed above in 300 parts of water. A further 6 parts of the mixture of fat-liquoring agents mentioned above are then added to the dyebath, followed after a further 40 minutes by a further 0.5 part of 85% formic acid, diluted with 5 parts of water. After a final period of treatment of 30 minutes at pH 3.8, the leather is rinsed and finished in a customary manner.

The upholstery leather is evenly and deeply dyed and has an olive brown hue.

EXAMPLE 10

100 parts of chrome tanned side leather are pretreated as described in Example 3 and are then divided into 6 equal sections.

These sections are each dyed in succession for 10 minutes at 50° in a liquor containing 0.1 part of each of the dyes of the formulae VII, VIII and IX in 150 parts of water. The individual sections are then rinsed and dried and differences in their hues are assessed visually or by means of reflectance measurements.

The 6 sections are in every case dyed brown (in a decreasing depth of shade) and exhibit no noticeable difference in hue.

EXAMPLE 11

The procedure described in Example 10 is repeated, but using a liquor which contains the same quantity of the dyes of the formula VII and IX, but contains the same quantity of the blue dye of the formula XII (depth of penetration approx. 15 μm)

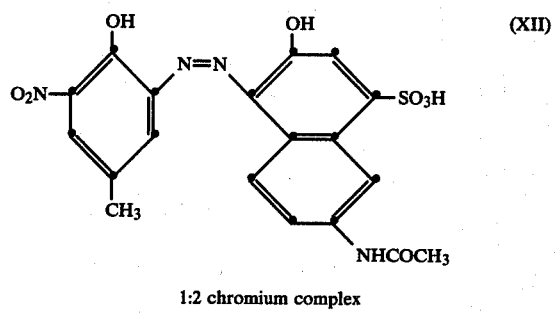

1:2 chromium complex instead of the blue dye used in Example 10. 6 sections which differ markedly in hue are obtained. The two sections dyed first are dyed bluish-tinged brown, whereas the two sections dyed last are dyed orange.

EXAMPLE 12

In order to improve the dye receptivity of the wool hairs, 100 parts of a neutralised woolled sheepskin which has been chrome tanned, fluffed and re-tanned with a chromium-containing synthetic tanning substance in the usual manner, are pretreated for 1 hour at 40° in a liquor prepared from 2,000 parts of water, 2 parts of 24% ammonia, 3 parts of calcined sodium carbonate and 1 part of a non-ionic wetting agent based on ethylene oxide adducts. The sheepskin is been thoroughly rinsed and is then centrifuged.

The sheepskin which has been pretreated in this manner is then worked for 10 minutes at 60° in a fresh liquor (pH 6.5) consisting of 2,000 parts of water, 2 parts of a shade-deepening carrier (a mixture of esters and non-ionic emulsifiers), 1 part of a wetting agent based on ethylene oxide adducts, 1 part of a naphthalenesulfonic acid condensation product and 1 part of a levelling agent (ethoxylated amines). 2.8 parts of a mixture of dyes composed of 1.68 parts of the dye of the formula IX, 0.56 part of the dye of the formula VII and 0.56 part of the dye of the formula VIII are now added. After a dyeing time of 45 minutes at 60°, 8 parts of a mixture of fat-liquoring agents consisting of 4 parts of an emulsifier-containing mixture of partially sulfonated chloroparaffins and natural fats, and also 4 parts of a sulfited fish oil, are added. After a further 15 minutes, the liquor is acidified (pH 3.7) with 2 parts of 85% formic acid, diluted with 20 parts of water, and the treatment is then continued for 45 minutes. The leather is then thoroughly rinsed and finished in a customary manner.

A yellowish-tinged brown dyeing is obtained, in which the wool and the leather side are dyed tone-on-tone.

EXAMPLE 13

100 parts of chrome split suede leather are wetted back for 60 minutes at 50° in 1,000 parts of water and 2 parts of 24% ammonia, and are then washed for 15 minutes with 1,000 parts of water at 50°.

The leather which has been pretreated in this manner is now dyed at 50° in a fresh liquor prepared from 1,000 parts of water, 2 parts of 24% ammonia, 2.0 parts of the yellow dye of the formula VI, 0.24 part of the red dye of the formula VII and 1.6 parts of the blue dye of the formula X. After 60 minutes 2 parts of 85% formic acid, diluted with 20 parts of water, are also added and dyeing is continued for a further 20 minutes at this temperature.

The dyed leather is rinsed in cold water and is finished in a customary manner. An olive brown dyeing is obtained, which is distinguished by good fastness properties and equality of shade between the suede and flesh sides.

EXAMPLE 14

The procedure of Example 13 is repeated in exactly the same manner, except that 1.2 parts of the yellow dye of the formula XI are used instead of 2.0 parts of the yellow dye of the formula VI. A dyeing of equal quality is obtained.

EXAMPLE 15

A medium brown pattern of unknown composition on polyamide was evaluated colorimetrically (hue=18.6, chroma=29.8 and value=33.3), and was subsequently imitated on 100 parts of neutralised chrome calf leather using the formulation, calculated by the computer, containing 0.30 part of the yellow dye of the formula VI, 0.438 part of the red dye of the formula VII and 0.092 part of the blue dye of the formula X

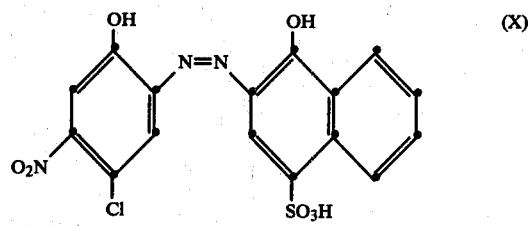

1:2 chromium complex and dyeing conditions analogous to those described in Example 3. This leather dyeing (hue=18.2, chroma=27.9 and value=34.0) is distinguished by very good agreement with the pattern on polyamide.

What is claimed is:

1. A process for dyeing leather and furs with a mixture of dyes, which comprises using, for dyeing, an aqueous liquor containing at least three 1:2 chromium or 1:2 cobalt complex dyes which have different colours, belong to the azo, azo-azomethine or azomethine series and have 1-6 sulfonic, carboxylic or phosphonic acid groups and which
(a) have a depth of penetration on standard chrome leather of between 20 and 200 µm, the differences in depth of penetration between the individual dyes in the mixture being within a range of 100 µm, and
(b) have no tendency, or only a slight tendency, to aggregate in an aqueous solution containing electrolytes.

2. A process according to claim 1, wherein the dyes used have a depth of penetration of 30-150 µm.

3. A process according to claim 1, wherein the dyes used are such that the depth of penetration of the individual dyes in the mixture is within a range of 50 µm.

4. A process according to any one of claims 1 to 3, wherein a mixture consisting of a yellow, a red and a blue dye is used.

5. A process according to claim 1, wherein the dyes used have a similar absorption behaviour.

6. A process according to claim 1, which comprises using a mixture of dyes of the formula I

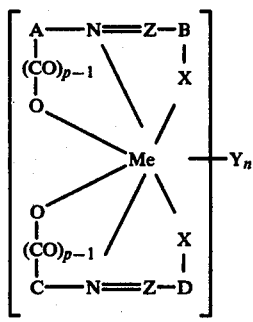
(I)

in which the Z's independently of one another are nitrogen or a CH group, A and C independently of one another are in each case a radical of the benzene or naphthalene series containing a hydroxyl or carboxyl group in the o-position in relation to the azo or azomethine group, B and D independently of one another are in each case the radical of a coupling component, provided that Z is nitrogen, the coupling component containing the group X in the o-position or α-position in relation to the azo group, or, if Z is a CH group, B and D independently of one another are the radical of an o-hydroxyaldehyde, the X's independently of one another are in each case oxygen or a group of the formula —NR— in which R is hydrogen or a $C_1$-$C_4$-alkyl group, Me is chromium or cobalt, Y is the $SO_3H$, COOH or $PO_3H_2$ group, p is 1 or 2 and n is an integer from 1 to 6.

7. A process according to claim 6, wherein a mixture of dyes of the formula I in which X is oxygen, is used.

8. A process according to claim 6, wherein a mixture of dyes of the formula I in which Y is the $SO_3H$ group, is used.

9. A process according to claim 6, wherein a mixture of dyes of the formula I in which p is 1, is used.

10. A process according to claim 6, wherein a mixture of dyes of the formula I in which n is 1 to 3, preferably 2, is used.

11. A process according to claim 6, wherein a mixture of dyes of the formula I in which each of the individual dyes has 24 to 40 C atoms, preferably 28 to 36 C atoms and particularly 32 C atoms, is used.

12. A process according to claim 6, wherein a mixture of 1:2 metal complexes of the formula I having a molecular weight between 800 and 1,000 (calculated as the free acid), is used.

13. A process according to claim 6, wherein a mixture of dyes of the formula I in which A and C independently of one another are each the radical of a 1-hydroxy-2-aminobenzene which is unsubstituted or monosubstituted or polysubstituted by identical or different substituents belonging to the series comprising nitro, sulfo, chlorine, methyl or methoxy, is used.

14. A process according to claim 13, wherein a mixture of dyes of formula I in which A and C are each the radical of a 1-hydroxy-2-aminobenzene which carries a nitro group in the 4-position or the 5-position, or are the radical of a 1-hydroxy-2-aminobenzene which carries a nitro group in the 4-position and a sulfo group in the 6-position, or are the radical of a 1-hydroxy-2-aminobenzene which carries a sulfo group in the 4-position and a nitro group in the 6-position, is used.

15. A process according to claim 6, wherein a mixture of dyes of the formula I in which B and D independently of one another are each the radical of one of the following coupling components: a phenol which couples in the o-position and which is unsubstituted or substituted by lower alkyl or alkoxy, amino or acylamino, resorcinol or m-phenylenediamine whih are unsubstituted or substituted in the 4-position by sulfo, chlorine, methyl or methoxy, naphthols which are unsubstituted or substituted by $C_1$-$C_4$-alkyl, $C_1$-$C_4$-alkoxy, chlorine, amino, acylamino or sulfo, 5-pyrazolones or 5-aminopyrazoles which have, in the 1-position, a phenyl or naphthyl radical which is unsubstituted or substituted by chlorine or nitro, $C_1$-$C_4$-alkyl, $C_1$-$C_4$-alkoxy or sulfo groups, and which have, in the 3-position, a $C_1$-$C_4$-alkyl group, in particular a methyl group, acetoacetamides and acetoacetanilides and benzoyl acetanilides which can, if desired, be substituted in the anilide nucleus by chlorine or $C_1$-$C_4$-alkyl, $C_1$-$C_4$-alkoxy or sulfo groups, or 6-hydroxy-3-cyano-4-alkyl-2-pyridones or 6-hydroxy-3-carbonamido-4-alkyl-2-pyridones which are substituted in the 1-position by substituted or unsubstituted $C_1$-$C_4$-alkyl, for example methyl, isopropyl, β-hydroxyethyl, β-aminoethyl or γ-isopropoxypropyl, or by phenyl, and which can carry a $C_1$-$C_4$-alkyl group, in particular methyl, in the 4-position, is used.

16. A process according to claim 15, wherein a mixture of dyes of the formula I in which B and D independently of one another are each the radical of one of the following coupling components: 1-naphthol or 2-naphthol which is unsubstituted or substituted by a sulfo group, m-phenylenediamine, resorcinol, p-($C_1$-$C_6$)-alkylphenol, 1-phenyl-3-methyl-5-pyrazolone or acetoacetanilide, it being possible for the phenyl group in the two compounds last-mentioned to be substituted by $C_1$-$C_4$-alkyl, $C_1$-$C_4$-alkoxy, chlorine or sulfo, is used.

17. A process according to claim 6, wherein a mixture of dyes of the formula I in which the individual dyes are each symmetrical 1:2 complexes containing a total of 2 sulfo groups, is used.

18. A process according to claim 6, wherein a mixture of dyes of the formula II

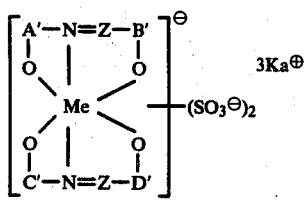

in which the Z's independently of one another are nitrogen or a CH group, A' and C' are in each case the radical of a 1-hydroxy-2-aminobenzene which carries a nitro group in the 4-position or 5-position, or are the radical of a 1-hydroxy-2-aminobenzene which carries a nitro group in the 4-position and a sulfo group in the 6-position, or are the radical of a 1-hydroxy-2-aminobenzene which carries a nitro group in the 6-position and a sulfo group in the 4-position, B' and D' independently of one another are in each case the radical of one of the following coupling components, provided that Z is nitrogen: 1-naphthol or 2-naphthol which is unsubstituted or substituted by a sulfo group, m-phenylenediamine, resorcinol, p-($C_1$-$C_6$)-alkylphenol, 1-phenyl-3-methyl-5-pyrazolone or acetoacetanilide, it being possible for the phenyl group in the two compounds last mentioned to be substituted by $C_1$-$C_4$-alkyl, $C_1$-$C_4$-alkoxy, chlorine or sulfo, or, if Z is the CH group, B' and D' are the radical of an o-hydroxybenzaldehyde or o-hydroxynaphthaldehyde which can be substituted by phenylazo or sulfophenylazo, Me is cobalt or chromium and Ka$^\oplus$ is a cation, is used.

19. A process according to claim 18, wherein a mixture of dyes containing (a) a dye of the formula III

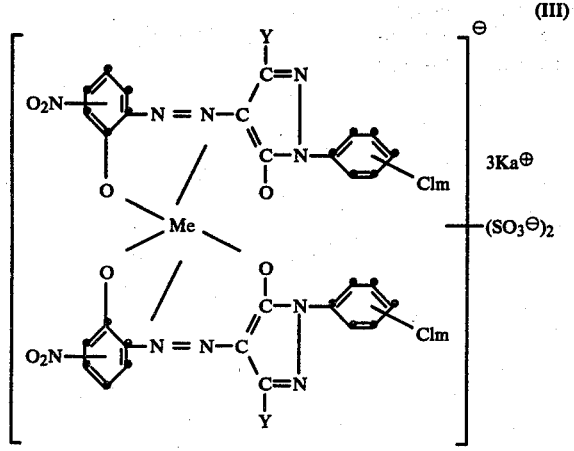

in which m is an integer from 0 to 2, Me is cobalt or chromium, Ka$^\oplus$ is a cation and Y is methyl, —$CONH_2$ or —CONHR, R being an alkyl group having 1 to 4 C atoms, (b) a dye of the formula IV

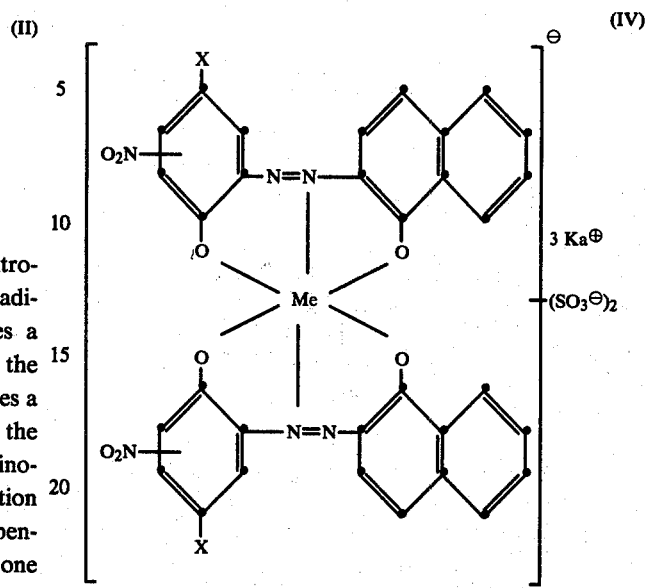

in which X is hydrogen, chlorine, methyl or methoxy, Me is cobalt or chromium and Ka$^\oplus$ is a cation, and (c) a further dye of the formula III indicated above or a dye of the formula V

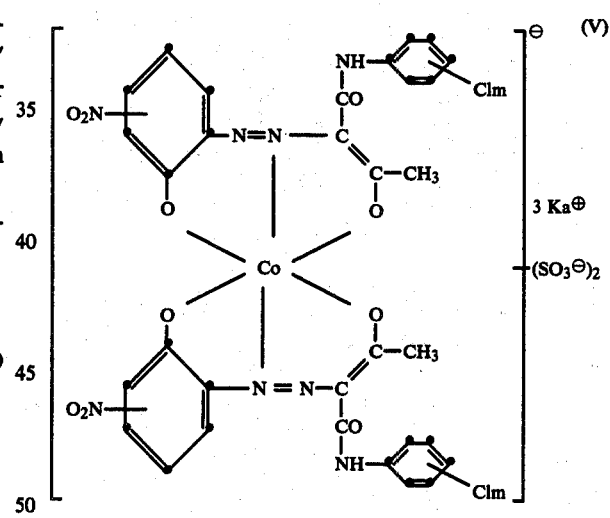

in which m is an integer from 0 to 2 and Ka$^\oplus$ is a cation, is used.

20. A process according to claim 19, wherein a mixture of dyes containing at least one of the following dyes:

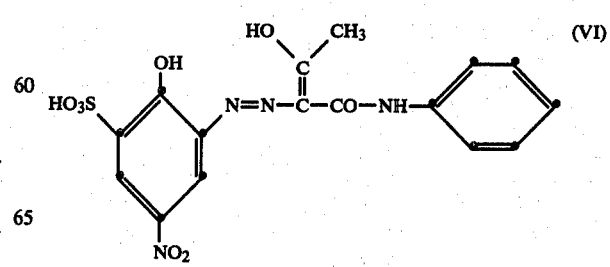

1:2 cobalt complex

-continued

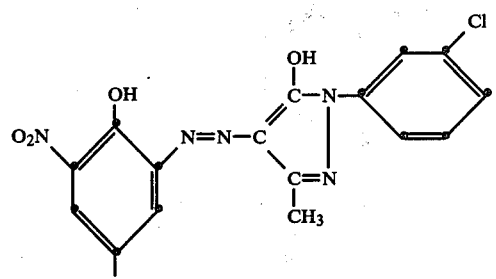

1:2 chromium complex

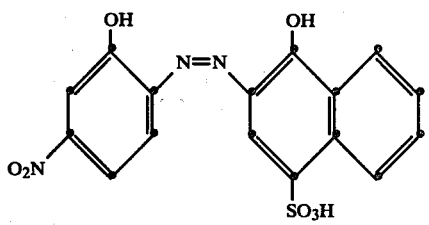

1:2 chromium complex

-continued

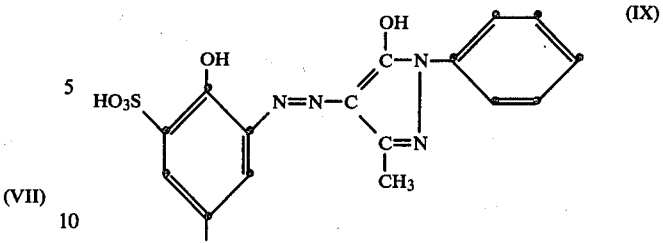

1:2 cobalt complex (X)

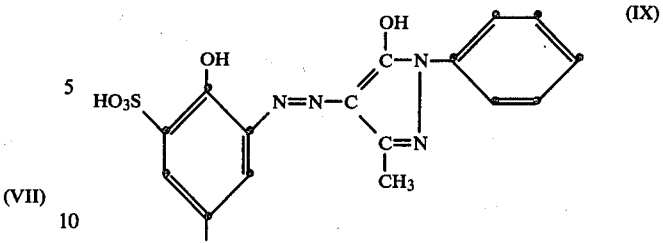

1:2 chromium complex (XI)

1:2 cobalt complex is used.

21. A process according to claim 1, wherein a dye liquor containing, in addition, a shade-deepening assistant, is used.

22. A process according to claim 21, wherein a dye liquor containing an ethoxylated alkylamine as the shade-deepening assistant, is used.

23. The leather or furs which have been dyed by the process according to claim 1.

* * * * *

UNITED STATES PATENT AND TRADEMARK OFFICE
CERTIFICATE OF CORRECTION

PATENT NO.   :  4,452,602
DATED        :  June 5, 1984
INVENTOR(S)  :  Alois Puntener, Josef Koller, Fabio Beffa It is certified that error appears in the above-identified patent and that said Letters Patent is hereby corrected as shown below:

On the cover page of the patent, line 73, the designated assignee was omitted. It should read--

Assignee:   Ciba-Geigy Corporation, Ardsley, N.Y. --.

Claim 15, Column 16, Line 32 should read-- amino, resorcinol or m-phenylenediamine which are --.

Signed and Sealed this

Seventeenth Day of September 1985

[SEAL]

Attest:

DONALD J. QUIGG

*Attesting Officer*

*Commissioner of Patents and Trademarks—Designate*